United States Patent [19]

Korpan

[11] Patent Number: 4,885,989
[45] Date of Patent: Dec. 12, 1989

[54] COOKING GRID SYSTEM

[76] Inventor: Brian A. Korpan, 540 Garfield St., New Westminster, B.C., Canada, V3L 4A7

[21] Appl. No.: 223,878

[22] Filed: Jul. 25, 1988

[51] Int. Cl.⁴ ............................................. A47J 37/07
[52] U.S. Cl. ........................................ 99/450; 99/385; 99/393; 126/9 A; 126/25 R
[58] Field of Search ........................ 99/450, 385, 393; 126/25 R, 9 A

[56] References Cited

U.S. PATENT DOCUMENTS

| | | | |
|---|---|---|---|
| 44,026 | 8/1864 | Teel | 99/450 X |
| 833,529 | 10/1906 | Jones | 99/450 X |
| 850,654 | 4/1907 | Jones | 99/450 X |
| 913,148 | 2/1909 | McNulty | 99/450 X |
| 3,082,757 | 3/1963 | Hohe | 126/25 R |
| 3,323,508 | 6/1967 | Holman | 126/25 |
| 3,404,671 | 9/1968 | Wasserman | 126/25 |
| 3,509,814 | 5/1970 | Karapetian | 126/25 R |
| 3,555,994 | 1/1971 | Nemetz | 126/25 R |
| 3,570,469 | 3/1971 | Jones | 126/9 A X |
| 3,717,083 | 2/1973 | Karapetian | 99/450 |
| 3,788,209 | 1/1974 | Artar et al. | 99/450 X |
| 4,763,639 | 8/1988 | Goldsworthy | 126/25 R |

FOREIGN PATENT DOCUMENTS 1319444 1/1962 France .................... 99/450

*Primary Examiner*—Stephen Marcus
*Assistant Examiner*—Christine A. Peterson

[57] ABSTRACT

A cooking grid system comprises a cover holder and a replaceable cover which can be fitted to the holder and substantially secured by a pivotal retainer. The holder comprising a grid and a pivotal retainer. The grid comprises a plurality of elongated rectangular shaped bars being aligned parallel to one another on an equal plane, spaced equally apart and supported by two elongated rectangular shaped crossbars. The retainer comprises a plurality of relatively thin elongated bars having uniform circular cross sections throughout their lengths. They are aligned parallel to one another on an equal plane, spaced equally apart and held in place by two crossbars located perpendicular to and at the ends of said retainer bars and are made of the same stock as said retainer bars. The retainer being supported at its back end by fitting the rear retainer crossbar in notches provided at the back end of a portion of the grid bars and being secured in the notches by two small spring wire retainers.

The replaceable cover can be fitted to the cover holder by opening the retainer, placing the cover face up on top of the grid, aligning the main cover portions with their corresponding grid bars and aligning one of the cover's folded edges with the front of the grid, finally, by closing the retainer and extending the two L-shaped bars over the retainer's front crossbar the system is ready for use.

7 Claims, 3 Drawing Sheets

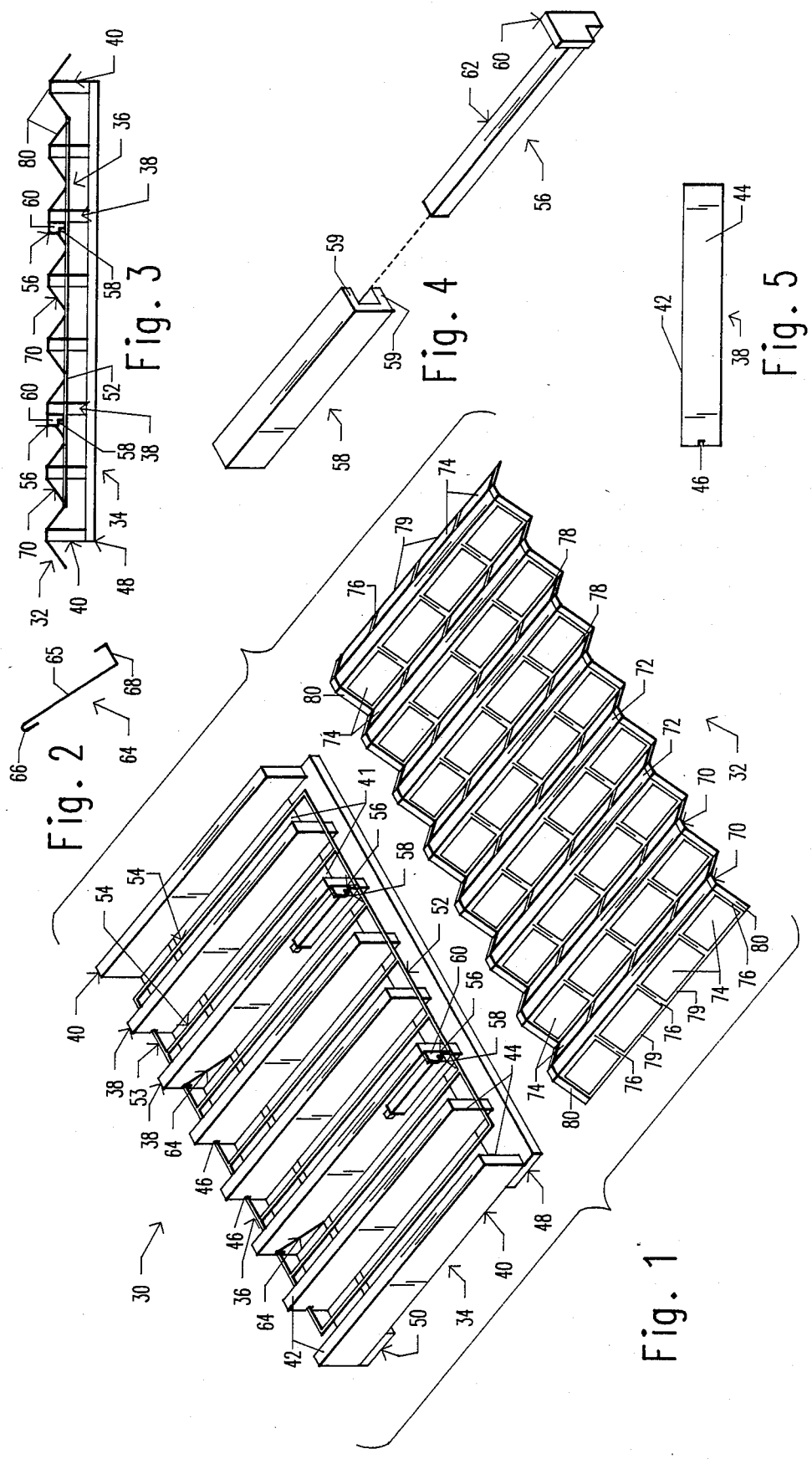

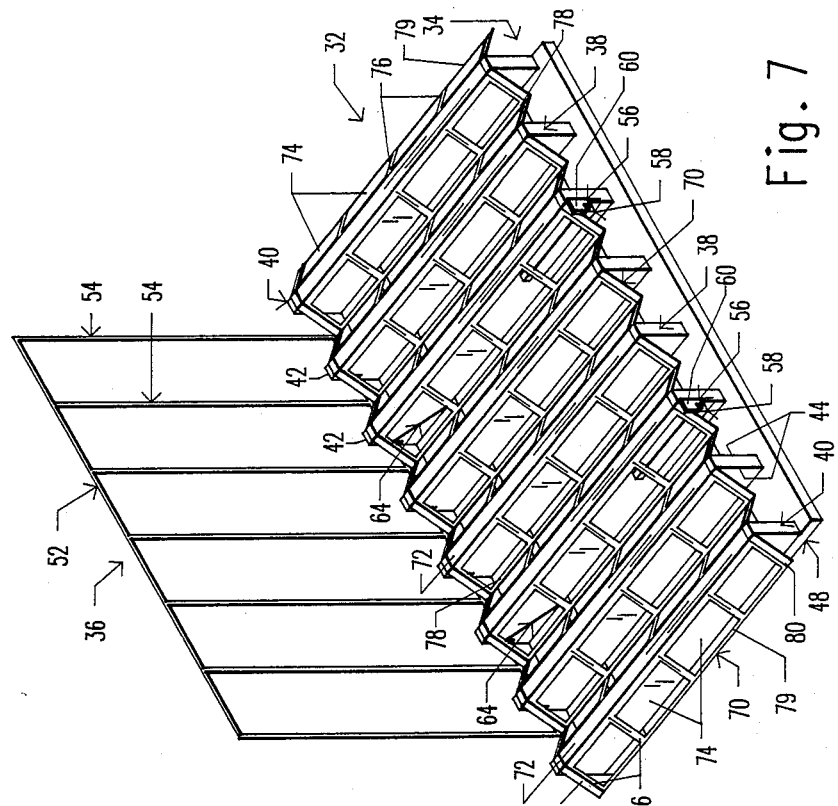
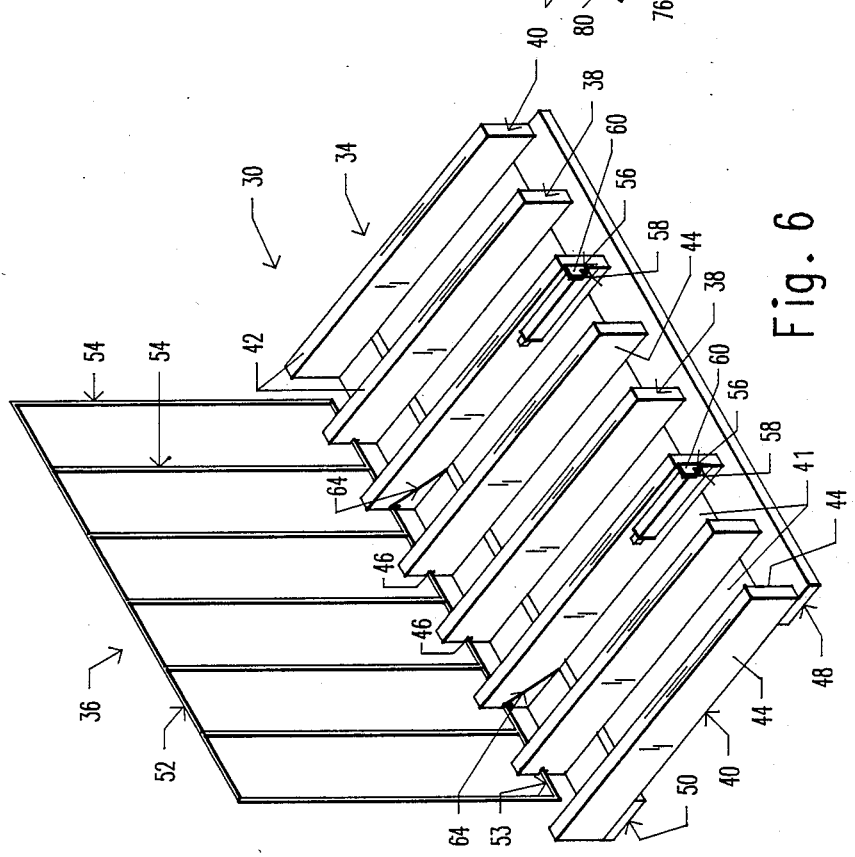

COOKING GRID SYSTEM

BACKGROUND—FIELD OF INVENTION

This invention relates to cooking grids comprising a cover holder and a replaceable cover, especially to cooking grids comprising a cover holder and a replaceable cover which is used as the cooking grid in barbecues. The replaceable cover being used as the cooking surface, and after use or at will it can be removed from its holder and replaced by a new replaceable cover.

BACKGROUND—DESCRIPTION OF PRIOR ART

Heretofore variations on one basic type of cooking grid have been proposed and widely commercially implemented for use in barbecues.

This basic grid generally takes the form of a plurality of parallel rods, spaced apart from one another, and fixed on an equal plane the outer most surface providing the cooking surface on which food is supported. The problem with this basic grid is, that cleaning it is an extremely messy, difficult, and time consuming process.

In essence, users found this type of cooking grid unsatisfactory because of the difficulty cleaning it. Therefore, most users would find it desirable to have a cooking grid which could provide a clean cooking surface more conveniently.

As a result of the inadequacies of the basic grid various disposable covers have been proposed for use with the basic grid. These proposals, however, have not proven to be optimal solutions to the problem. For example, most of the proposals provide a cover which has downward projecting tabs which must be carefully aligned with the grid prior to lowering the cover into place. As a result, use of these proposals has proven to be inconvenient. Further, many of these proposals do not provide a means to hold the cover down on to the grid to prevent unintentional latitudinal separation of the cover from the grid when the user is attempting to remove food which has stuck to the cover during the cooking process. In addition, some proposals have suggested that to overcome this problem the user must manually deform the cover around the lower section of each rod in order to hold the cover in place. The hold provided by this method, however, has proven to be both inconvenient to obtain and insufficient to prevent the cover from being unintentionally latitudinally separated from its grid.

To overcome the problem of unintentional latitudinal separation of the cover from the grid, another proposal has provided a cover which totally encompasses each grid rod. This, however, has proven to be unsatisfactory because to fit the cover to the grid requires the partial dismantling of the grid and the subsequent fitting of each rod's cover one at a time. Accordingly, this proposal has proven to be inconvenient to operate.

Further, handling characteristics of many of the prior art proposals is inflexible. Most proposals must be shipped flat (not rolled) and if deformed in any way they may be rendered useless.

In essence, these proposals have proven to be non-optimal in solving the problem of obtaining a clean and secure cooking grid surface. Therefore, users would find it desirable to have a cooking grid which could provide them with a clean and secure cooking grid surface more conveniently.

BRIEF SUMMARY—OBJECTS AND ADVANTAGES

Accordingly, several objects and advantages of my invention are: to provide a novel cooking grid system for easily, reliably, neatly, quickly, and conveniently providing a clean cooking surface, to provide a cooking grid system with a replaceable cover which can not be unintentionally removed from its holder during normal cooking procedures, to provide a cooking grid system with a replaceable cover which allows for efficient shipping and handling and which, in many cases, can be used even after becoming unintentionally deformed, to provide a cooking grid system which requires a minimum of skill, training and effort to use, to provide a cooking grid system which completely eliminates the need for users to waste time and energy cleaning a cooking grid.

In addition, more objects and advantages of my invention are: to provide a cooking grid system compatible with barbecue grills, gas barbecues, broiler pans, etc., to provide a cooking grid system that can improve the taste and appearance of foods prepared on it by easily providing a clean cooking surface, thereby eliminating contact between fresh food and old burnt food residue when used correctly, proper use of my invention may also result in health benefits for users of my invention because scientific studies have shown that carcinogenic substances are found in burnt cooking residue.

Readers will find further objects and advantages of my invention from a consideration of the ensuing description and the accompanying drawings.

BRIEF DESCRIPTION OF DRAWING FIGURES

FIG. 1 shows a perspective front elevational view of a cover holder and a replaceable cover according to the invention.

FIG. 2 shows an enlarged perspective front elevational view of a small spring wire retainer of the cover holder of FIG. 1.

FIG. 3 shows a front end plan view of the replaceable cover fitted to the cover holder, both of FIG. 1.

FIG. 4 shows an enlarged perspective front elevational view of an L-shaped bar being longitudinally separated from its U-shaped bracket, both of the cover holder of FIG. 1.

FIG. 5 shows a side plan view of a single grid bar of the cover holder of FIG. 1.

FIG. 6 shows a perspective front elevational view of the cover holder of FIG. 1 with its retainer in a 90 degree open position relative to the grid.

FIG. 7 shows a perspective front elevational view of the cover holder with its retainer in a 90 degree open position relative to the grid and fitted with a replaceable cover, both of FIG. 1.

DRAWING REFERENCE NUMERALS

Figure 8:
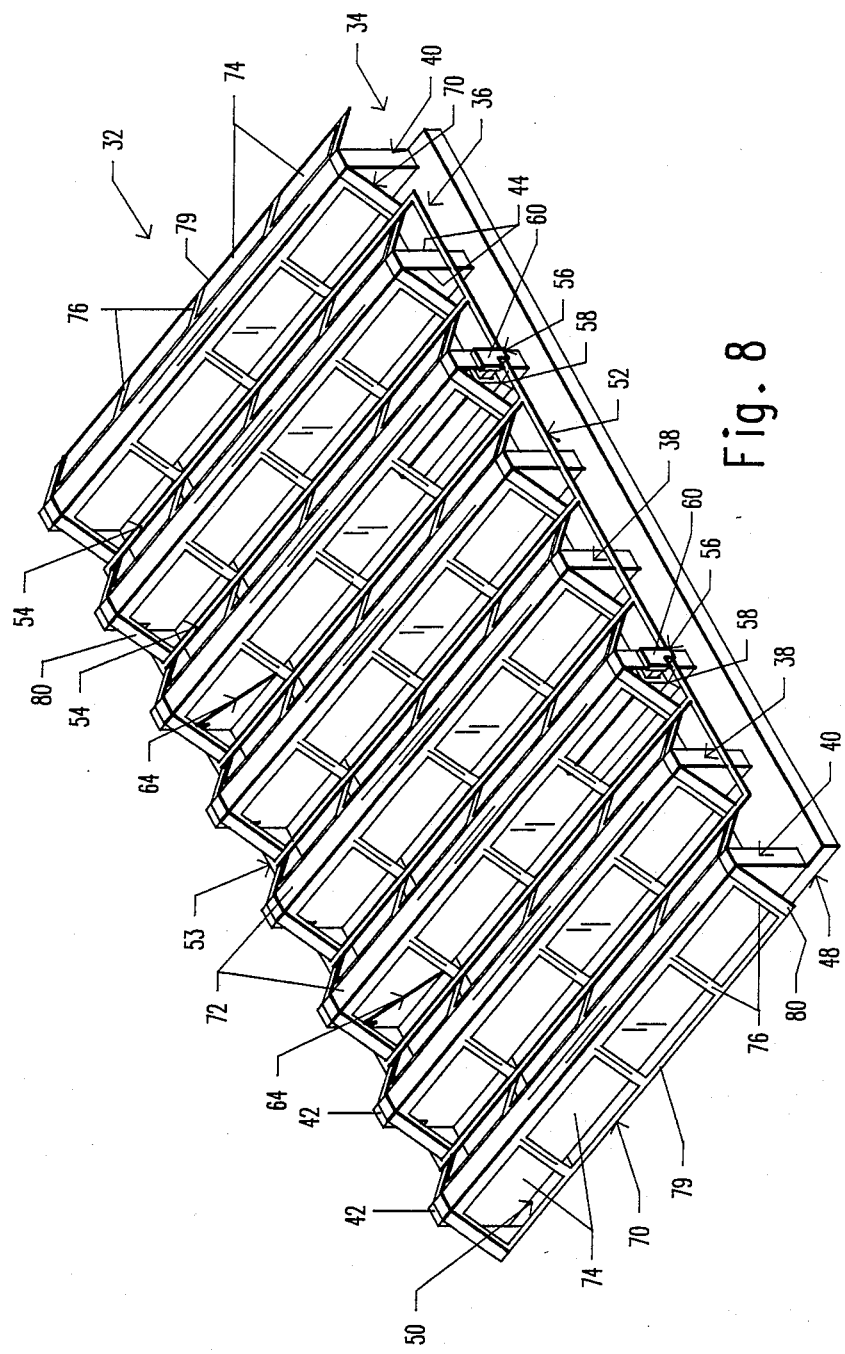
FIG. 8 shows an enlarged perspective front elevational view of the cover holder with a cover being fully fitted and with the cover holder's retainer in a fully closed position, all of FIG. 1.

30 cover holder
32 replaceable cover
34 grid of 30
36 retainer of 30
38 notched bars of 34
40 unnotched bars of 34

41 gaps between 38 and 40
42 top side of 38 and 40
44 sides of 38 and 40
46 notch in 38
48 front crossbar of 34
50 rear crossbar of 34
52 front retainer crossbar
53 rear retainer crossbar
54 retainer bars
56 L-shaped bar
58 U-shaped bracket
59 leg members of 58
60 upward projection of 56
62 elongated body of 56
64 spring wire retainer
65 elongated body of 64
66 upper hook portion of 64
68 lower hook portion of 64
70 canopy shaped sections of 32
72 main cover portions of 70
74 openings in 70
76 connecting portions of 70
78 retainer seats of 32
79 terminal edge of 32
80 folded edge of 32

DESCRIPTION OF PREFERRED EMBODIMENT

FIG. 6 shows a perspective view of the cover holder 30 with its retainer 36 in a 90 degree open position relative to the grid 34. The grid 34 comprises a plurality of elongated rectangular shaped bars 38 and 40. The difference between bars 38 and 40 being that bars 38 each have a small notch 46 in their back ends, while bars 40 have no notches. The notches 46 in the back ends of bars 38 are used to support the rear retainer crossbar 53 and also act as a pivot point for opening and closing the retainer 36. The bars 38 and 40 are equal lengths and are aligned parallel to one another on an equal plane and are spaced equally apart creating gaps 41. The rectangular shaped section of each bar 38 and 40 is illustrated best in FIG. 3 which shows a front end plan view of the replaceable cover 32 fitted to the cover holder 30 both of FIG. 1. Clearly illustrated in FIG. 3, is the top 42 of each bar 38 and 40 which is substantially covered by the main cover portions 72 of the replaceable cover 32. The retangular shape of each bar 38 and 40 provides sufficient latitudinal space to allow the retainer 36 to hold the cover 32 in place without obstructing the cooking surface.

The grid 34 is a one piece cast construction preferably made of an aluminium alloy. Accordingly, the bars 38 and 40 are held in place by having their bottom sides integrated, in the casting process, with the top sides of the front crossbar 48 and rear crossbar 50. The crossbars 48 and 50, both have elongated rectangular shapes with uniform sections throughout their entire lengths. Accordingly, because the grid is a cast construction the crossbars 48 and 50 are preferably made of an aluminium alloy.

FIG. 1 shows a perspective view of the cover holder 30 and replaceable cover 32 according to the invention. Each gap 41 between the bars 38 and 40 can be any width which practically provides enough room for a retainer seat 78 and a retainer bar 54. The major consideration in sizing the gaps 41 being the provision of large enough gaps 41 so that openings 74 in cover sections 70 can be made large enough to allow the free flow of heat upwards to the cooking surface and the opposite movement of grease, etc.

Note, that the back edge of the rear crossbar 50 is flush to the back end of bars 38 and 40. But, that the front edge of the front crossbar 48 extends beyond the front ends of bars 38 and 40. The position of the front crossbar 48 provides clearance between the front end of bars 38 and 40 and any opposing member which may butt up against the outside edge of the front crossbar 48 in applications previously suggested. This clearance provides enough space for the placement and removal of the retainer's front crossbar 52 during operation of the invention.

Referring again to FIG. 6, the retainer 36 is preferably made using a casting process and preferably made of a relatively hard aluminium alloy in order to give the retainer 36 sufficient rigidity. The retainer 36 comprises a plurality of elongated retainer bars 54 having uniform circular cross sections throughout their entire lengths. The retainer bars 54 further being equal lengths, spaced equally apart, and held in place on an equal plane by front and rear retainer crossbars 52 and 53 respectfully. The retainer crossbars 52 and 53 being equal lengths, and having the same cross sections as the retainer bars 54. Note, that the retainer bars 54 are longer than the grid bars 38 and 40 to allow the retainer's front crossbar 52 to clear the front end of the top sides 42 of bars 38 and 40 when opening or closing the retainer 36.

Shown best in FIG. 1, is the retainer 36 in its closed position. The retainer 36 is held on a plane in approximately the center of gaps 41 between bars 38 and 40. Allowing the retainer 36 to pivot from its closed position, shown best in FIG. 1, to its fully open position, shown best in FIG. 6, are the notches 46 located in the back ends of bars 38. Shown best in FIG. 5, which is a side plan view of a grid bar 38, is a notch 46. Each notch 46 is shaped like a "U" which has been rotated 90 degrees counter clockwise, and has larger dimensions than the retainer's rear crossbar 53 which is supported in the notches 46, and is shown best in FIG. 1.

Two small spring wire retainers 64 prevent the rear retainer crossbar 53 from being unintentionally freed from the notches 46. The small spring wire retainers 64 are best illustrated in FIG. 2 which is an enlarged perspective view of one spring wire retainer 64. The upper hook portion 66 is shaped relative to the rear retainer crossbar 53 and is hooked over the rear retainer crossbar 53 while the lower hook portion 68 is shaped relative to the lower portion of a bar 38 or 40 and is hooked under a notched bar 38. The spring wire retainer's elongated body 65 is simply an elongated piece of spring wire connecting the upper hook portion 66 with the lower hook portion 68. Further, the overall length of the spring wire retainer 64 is just long enough to allow it to be fitted firmly in place. Accordingly, the spring wire retainers 64 effectively prevent the rear retainer crossbar 53 from being unintentionally freed from the notches 46, which is shown best in FIGS. 1 and 6. Finally, each spring wire retainer 64 is preferably made of a single piece of steel spring wire.

Located on one side 44 of two bars 38 is a small L-shaped bar 56 being held in place by a U-shaped bracket 58. Each L-shaped bar 56 and U-shaped bracket 58 provides a means for holding the retainer 36 in a closed position once a cover 32 has been fitted. This is illustrated best in FIG. 8 which shows an enlarged perspective view of a cover holder 30 having a cover 32 fully fitted. Once the cover 32 is fitted and the retainer 36 is closed, as shown in FIG. 8, each L-shaped bar 56 is extended from its bracket 58 until its upward projection 60 is on top of or pulled forward of the retainer's front crossbar 52.

The construction of the L-shaped bar 56 and U-shaped bracket 58 is best illustrated in FIG. 4 which shows an enlarged perspective view of the L-shaped bar 56 pulled forward and free of its bracket 58. The L-shaped bar 56 is a one piece construction preferably being cast out of an aluminium alloy. Its elongated body 62 has a uniform square cross section throughout its length. At the front end of the L-shaped bar 56 is the upward projection 60 which has a uniform rectangular cross section throughout its length and has an attitude of 90 degrees relative to the elongated body 62. As well as providing a grasping point for the user to pull the L-shaped bar 56 forward, the upward projection 60 prevents the L-shaped bar 56 from being pushed too far back into its bracket 58. This stopping point is where the back side of the upward projection 60 is flush to the front end of the bar 38 on which it is located.

There is generally no need for a means to prevent the L-shaped bar 56 from being pulled forward and free of its bracket 58. This is because when the holder 30 is in position in a barbecue unit's upper body (not illustrated) the front edge of the holder 30 is usually opposed by the front wall of the unit's upper body. Therefore, this front wall of the barbecue unit's upper body provides the extension stop for the L-shaped bar 56.

The U-shaped bracket 58, shown best in FIG. 4, is a one piece construction being cast, at the free end of its leg members 59, directly on to the side of its host bar 38 and therefore being made of the same aluminium alloy as the grid 34. Each bracket 58 is located approximately half way down the side of its host bar 38, having an aspect parallel to the bar 38, with the front edge of the bracket being flush to the front edge of the bar 38. Further, each bracket 58 has a uniform U-shaped cross section throughout its length which is rotated 90 degrees clockwise.

By casting the grid 34 and retainer 36 each in one piece and then combining them with two spring wire retainers 64 to form the cover holder 30, I have eliminated the need for use of screws, nuts and bolts, pins, etc. Accordingly, this will minimize production costs.

The entire cover holder 30 can be treated with suitable platings or coatings to enhance durability or appearance, however, such treatment is not a necessity.

The dimensions of the cover holder 30 are determined by the specific application desired. The latitudinal dimensions of the bars 38 and 40, however, should be standardized in order to reduce the number of different sizes required to service specific markets. Some standardization will also provide upward compatibility of the replaceable covers 32. That is, by standardizing the height and width dimensions of the bars 38 and 40, and gaps 41, covers having smaller outside dimensions than a specific cover holder could be fitted and used with the larger holder.

The replaceable cover 32 of FIG. 1 is also shown fully fitted in the holder 30 in a front end plan view in FIG. 3, and perspective views in FIG. 7 (open retainer), and FIG. 8 (closed retainer).

The replaceable cover 32 is a one piece construction being preferably made of reasonably strong aluminium foil. The cover 32 mainly comprises a plurality of identical elongated canopy-like sections 70 which have a truncated pyramid shaped when viewed from either end, shown best in FIG. 3. The merger between sections 70 takes place at the retainer seats 78 which are elongated and substantially V-shaped. Accordingly, the sections 70 are aligned parallel to one another on an equal plane.

The main cover portions 72 are flat elongated rectangles which are used to cover the top side of their corresponding support bar 38 or 40. Thus, they are identical in shape to the top side of each bar 38 or 40. They are, however, shorter than the top sides of bars 38 and 40 to allow clearance for the rear retainer crossbar 53 which sits indented in the notches 38. Thus, the overall cover 32 is shorter than the bars 38 and 40 by an amount equal to the depth of each notch 46.

Accordingly, to fit the cover 32 in the correct position on the holder 30 simply requires the user, after placing the cover 32 on the grid 34, to push the cover 32 towards the back of the holder 30 until the back edge of the cover 32 meets the rear retainer crossbar 53. This position sets the front edge of the cover 32 flush to the front edge of each bar 38 or 40, see FIG. 7. The retainer 36 can now be closed and locked in place by extending the two L-shaped bars 56, as shown in FIG. 8.

Each section 70 has rectangular openings 74 which are bordered on their top edges by the main cover portions 72, on their lower edges by the cover retainer seats 78 or terminal edges 79, and on each end by connecting portions 76. All openings 74 are designed to allow the passage of heat and smoke upwards from the burner unit (heat source) to the cooking surface. Also, the simultaneous passage of cooking by products (grease etc.) downward on to the lava rocks, coals, etc., which produces the smoke which flavors the food being prepared.

Located where two cover sections 70 merge, are the cover's retainer seats 78. The seats 78 are formed at the base of the valley between two adjacent cover sections 70, shown best in FIG. 3. The seats 78 are elongated members having uniform V-shaped cross sections throughout their lengths, and are held on a plane approximately in the center of the gaps 41 between bars 38 and 40, and are equal to the main cover portions 72 in length.

Connecting the main cover portions 72 to the retainer seats 78 are connecting portions 76. The connecting portions 76 have a flat elongated rectangular shape and merge into the main cover portions 72 at their top ends and the retainer seats 78 at their bottom ends. Further, the connecting portions 76 have the same attitude as the portions with which they merge. Accordingly, the connecting portions 76 effectively suspend the retainer seats 78 in place.

Finally, the entire front and rear edge of the cover 32 comprises a folded edge 80 which adds rigidity across their lengths and provides the user with a more robust area in which to grasp when handling the cover 32.

The unique design of the cover 32 allows for very high speed low cost production utilizing high speed cutting and stamping equipment having a provision to create the folded edge 80 prior to stamping the cover 32 into its final form. In addition, the unique design of the cover 32 allows them to be stacked one on top of the other for easy and low cost packaging, handling, shipping, and storage. Further, if a cover 32 becomes unintentionally deformed during handling, and unless the deformation is extremely severe, the cover can be easily manipulated back into a form which can be utilized by the system. This capability is due to the absence of extended tabs and tubular bodies in the construction of the cover 32.

Finally, the strength of the hold between the cover 32 and its holder 30 depends not on the cover material's resistant to deformation, as in some proposals, but rather on the cover material's resistance to breaking. Accordingly, my invention allows a much thinner gauge of aluminium foil to be used, providing greater holding strength than other proposals which utilize thicker gauges of aluminium foil. Therefore, this implies that my invention will allow lower cost, production, shipping, storage, etc., compared to other proposals. In turn, this implies the potential for the creation of greater surplus values by the production of my invention as compared to other proposals.

The dimensions of the cover 32 are determined by the dimensions of the holder 30.

OPERATION OF PREFERRED EMBODIMENT

The invention of FIGS. 1, 3, 7 and 8 is suitable for use in many barbecue grills, most gas barbecues, and can be mated with a broiler pan for oven cooking. In most gas barbecue, it would provide half the cooking surface with the other half provided by a duplicate cooking grid system placed beside the first grid and having the same attitude etc.

The application of the invention to gas barbecues is such, that when the invention is installed in a barbecue unit's burner casing it is usually supported by at least two small ledges on which the bottoms of crossbars 48 and 50 would rest.

The following operation description deals specifically with the operation of the invention in used gas barbecues. Installation of the holder simply requires the user to lift out the old cooking grid(s) and replace it (them) with two relevantly sized holders 30 so that crossbars 48 and 50 are resting on their corresponding support ledges and their front crossbars 48 are at the front of the unit's body. In most gas barbecues this places each holder 30 on a level plane below the top edge of the unit's body surrounded by opposing members (not illustrated).

The best method to apply a cover 32 to one of the holders 30 is as follows: first, the user should make sure that the holder 30 is cool enough to be handled safely, second, the user will push the L-shaped bars 56 toward the back of the unit until they are flush to the front end of their respective host bars 38, third, the user will lift the retainer 36 by its front crossbar 52 into approximately a 90 degree position relative to the grid 34, see FIG. 6, fourth, the user will then place a cover 32 on top of the grid 34 with its top facing up and either folded edge 80 at the front of the unit, because of the pyramid cross section shape of the cover sections 70 the cover 32 will almost fall into place by itself once it is placed on top of the grid 34, fifth, once the cover is on top of the grid 34 the user will make sure that it is pushed back against the rear retainer crossbar 53, see FIG. 7, finally, the user can now close the retainer 36 down on to the cover 32 and while holding it down below the bottom side of the elongated body 62 of each L-shaped bar 56, the user can pull each L-shaped bar 56 out toward the front of the unit until they extend beyond the front retainer crossbar 52 or until they contact the inside surface of the front opposing member of the unit, see FIG. 8 for a ready to use cooking grid system.

Removing a used cover 32 simply requires the user to lift the cover 32 off the grid 34, during step three above, and then to discard the used cover 32 in a suitable facility.

While the above description contains many specifities the reader should not construe these as limitations on the scope of the invention, but merely as exemplifications of a preferred embodiment thereof. Those skilled in the art will envision many other possible variations that are within its scope. For example, skilled artisans will readily be able to change the dimensions and shape of the embodiment. They will be able to make the components of the cooking grid system out of alternate materials, such as other metals, ceramics, and even some plastics. They can put different platings or coatings on the holder. They could make the holder and cover out of a combination of pieces. They could change the number of crossbars, bars, etc., and also change their shapes, locations, and dimensions.

Further, they could construct the grid out of several joined pieces, rather than casting it in one piece. They could make the holder to be supported in a barbecue unit's body by more than two ledges or by using a central post or by cantilevering the holder, etc. They could construct the replaceable cover out of several pieces rather than forming it out of a single piece of aluminium foil.

They could construct the retainer, L-shaped bars, U-shaped brackets, and spring wire retainers out of several pieces and/or change their shapes, dimensions, and locations. For example, bolt on brackets could easily replace the spring wire retainers and notches in order to secure the retainer's rear crossbar and to provide a pivot point for said rear retainer crossbar. In essence, there is a multitude of brackets which could be designed to replace the cooperative function of the notches and the spring wire retainers.

Continuing, the L-shaped bars and U-shaped brackets could easily be replaced by spring tensioned clips attached to the front crossbar in order to hold the retainer's front crossbar down when the retainer is in a closed position. In essence, there is a multitude of clips, latches, catches, etc., that could be designed to replace the L-shaped bars and U-shaped brackets in order to hold the retainer in a closed position.

In addition to being used in most gas barbecues, my invention can be used in many barbecue grills, and can be mated with a broiler pan for oven cooking.

In fact, almost any grid like structure could be replaced by an embodiment of my invention whether for cooking or otherwise.

Accordingly, the reader is requested to determine the scope of my invention by the appended claims and their legal equivalents, and not by the examples which have been given.

I claim:

1. A cooking grid system comprising: a grid, a retainer, a replaceable cover, and a cooperative locking means between said grid and said retainer which allows said retainer to be opened to fit or remove said replaceable cover to said grid and then to be closed to releasably and positively sandwich said replaceable cover between said retainer and said grid to form an operative cooking grid, said grid comprising a plurality of spaced apart supporting bars for said replaceable cover, said grid, said retainer, and said replaceable cover being shaped relative to one another to permit said replaceable cover to be fitted to or removed from said grid and to be positively sandwiched between said retainer, and said grid, said replaceable cover provided with retainer seating portions which provide for positive positioning of said retainer when said retainer is closed onto said replaceable cover, said retainer when in a closed position being disposed adjacent said supporting bars, said replaceable cover substantially covering the top portion of said supporting bars when said replaceable cover is fitted thereto, wherein said replaceable cover is provided with a plurality of elongated canopy shaped sections being supported by said supporting bars when said replaceable cover is fitted thereto, said replaceable cover being made of a manually deformable substance, whereby: in the event of said operative grid becoming soiled said retainer can be opened and said replaceable cover can be removed from said supporting bars and a new replaceable cover can be fitted to said supporting bars and said retainer closed to provide at least one clean outer surface on said operative grid.

2. The cooking grid system of claim 1 wherein said retainer comprising a plurality of bars being spaced apart relative to the spaces between said plurality of spaced apart supporting bars of said grid, such that said retainer bars can be disposed between said supporting bars when said retainer is in a closed position.

3. The cooking grid system of claim 2 wherein said retainer having a front and rear crossbar fixing said bars of said retainer together.

4. The cooking grid system of claim 1 wherein said cooperative locking means comprising a rear crossbar of said retainer being supported in notches provided in the back ends of a portion of said plurality of spaced apart supporting bars of said grid, with said rear crossbar acting as a pivotal axis for opening and closing said retainer, said retainer when in a closed position having a front crossbar releasably held by a locking means.

5. A cooking grid system comprising: a grid, a retainer, a replaceable cover, a pivot means pivotally interconnecting said retainer and said grid to permit said retainer to be pivoted between an open and closed position about a pivot axis, and a locking means for releasably holding said retainer in a closed position, said grid comprising a plurality of spaced apart supporting bars for said replaceable cover, said grid, said retainer, and said replaceable cover being shaped relative to one another to permit said replaceable cover to be fitted to or removed from said grid and to be positively and releasably sandwiched between said retainer and said grid to form an operative cooking grid, said replaceable cover provided with retainer seating portions which provide a cooperative seat for positively positioning said retainer when said retainer is closed onto said replaceable cover, said replaceable cover substantially covering the top portion of said supporting bars when said replaceable cover is fitted thereto, wherein said replaceable cover is provided with a plurality of canopy shaped sections being merged together and supported by said supporting bars when said replaceable cover is fitted thereto, whereby: in the event of said operative grid becoming soiled, said retainer can be opened and said replaceable cover can be removed from said supporting bars and a new replaceable cover can be fitted to said supporting bars and said retainer closed onto said new replaceable cover to provide at least one clean outer surface on said operative grid.

6. The cooking grid system of claim 5 wherein said retainer comprising a plurality of elongated bars being spaced apart relative to the spaces between said plurality of spaced apart supporting bars of said grid, said retainer having a front and rear crossbar fixing said bars of said retainer together.

7. The cooking grid system of claim 5 wherein said pivot means comprising a rear crossbar of said retainer being supported in notches provided in a portion of said supporting bars of said grid, said rear crossbar held in said notches by at least one spring wire retainer.

* * * * *